United States Patent [19]

Younghouse

[11] 4,425,907

[45] Jan. 17, 1984

[54] REFLECTOR-COUPLED FLUORESCENT SOLAR COLLECTOR

[75] Inventor: Lawrence B. Younghouse, Boonton, N.J.

[73] Assignee: Exxon Research and Engineering Co., Florham Park, N.J.

[21] Appl. No.: 325,281

[22] Filed: Nov. 27, 1981

Related U.S. Application Data

[63] Continuation of Ser. No. 190,666, Sep. 25, 1980, abandoned.

[51] Int. Cl.³ ............................................. F24J 3/02
[52] U.S. Cl. .................................... 126/439; 126/441; 126/901; 136/247; 350/96.10
[58] Field of Search ............... 126/901, 438, 439, 441, 126/449, 417, 450; 136/247; 350/96.10, 96.29

[56] References Cited

U.S. PATENT DOCUMENTS

| | | | |
|---|---|---|---|
| 3,051,038 | 8/1962 | Duke | 126/439 |
| 3,134,906 | 5/1964 | Henker | 126/438 |
| 3,869,199 | 3/1975 | Cummings | 126/439 |
| 3,968,786 | 7/1976 | Spielberg | 126/441 |
| 4,026,267 | 5/1977 | Coleman | 126/449 |
| 4,026,273 | 5/1977 | Parker | 126/438 |
| 4,141,340 | 2/1979 | Niedermeyer | 126/439 |
| 4,149,902 | 4/1979 | Mauer et al. | 126/441 |
| 4,171,003 | 10/1979 | Forrat | 136/247 |
| 4,184,895 | 1/1980 | Oster | 126/442 |
| 4,201,197 | 5/1980 | Dismer | 126/439 |
| 4,204,881 | 5/1980 | McGrew | 126/438 |
| 4,230,095 | 10/1980 | Winston | 126/438 |
| 4,246,891 | 1/1981 | Lambert | 126/438 |
| 4,264,124 | 4/1981 | Greubel | 350/96.10 |
| 4,292,959 | 10/1981 | Coburn | 126/438 |
| 4,306,542 | 12/1981 | Reinert | 126/901 |

Primary Examiner—Daniel J. O'Connor
Attorney, Agent, or Firm—Joseph J. Dvorak

[57] ABSTRACT

The present invention provides a system for the collection of electromagnetic radiation and the transmission of that radiation to a point of use. In its simplest sense, an apparatus for the collection and transmission of electromagnetic radiation comprises a cylindrical fluorescent fiber, at least one end of which is optically coupled to an optical wave guide, and means for reflecting solar radiation impinging over a relatively wide area onto said cylindrical fluorescent fiber. Preferably, a compound parabolic mirror is employed for reflecting incident solar radiation onto the optical fluorescent fiber.

7 Claims, 5 Drawing Figures

REFLECTOR-COUPLED FLUORESCENT SOLAR COLLECTOR

This is a continuation of application Ser. No. 190,666, filed Sept. 25, 1980, now abandoned.

FIELD OF THE INVENTION

The present invention relates generally to solar collectors. More particularly the instant invention is concerned with the collection of solar radiation over a relatively large area, concentrating it and transmitting it to a point of use.

BACKGROUND OF THE INVENTION

The economic conversion of solar radiant energy into electrical or thermal energy requires a relatively high solar flux impinging on the conversion device. Consequently, there have been numerous attempts to collect the generally diffused sunlight falling on relatively large areas, concentrating it into a small area for more efficient conversion of the radiant energy to a more useful form of energy. In U.S. Pat. No. 4,114,592, for example, there is disclosed a lense type device for collecting solar radiation over a relatively large area and focusing it onto a relatively small area. Lense type devices suffer from the disadvantage that they are expensive and have aberrations that result in lower than optimum efficiency. Another type of solar concentrator employs mirrors such as a parabolic mirror for focusing the incident solar radiation onto a thermal energy collector. U.S. Pat. No. 4,154,219 is exemplary of a system employing a parabolic focusing device. These types of devices suffer from thermal and reradiation losses.

Another type of solar concentrating device consists of a large area of fluorescent material on which solar radiation impinges and as a consequence thereof, the fluorescent material emits radiation which is internally reflected within the collector and directed toward a smaller area where it is optically coupled, for example, to a photovoltaic device. Examples of such devices are given in U.S. Pat. No. 4,149, 902 and U.S. Pat. No. 4,188,238. Among the disadvantages of these devices are the high costs of fluorescent materials and the geometric constraints in coupling the collector with an energy converter.

From the foregoing it is apparent there is a need for new and improved solar energy collection systems.

SUMMARY OF THE INVENTION

According to this invention, there is provided a system for the collection of electromagnetic radiation and the transmission of that radiation to a point of use. In its simplest sense, an apparatus for the collection and transmission of electromagnetic radiation comprises a cylindrical fluorescent fiber, at least one end of which is optically coupled to an optical wave guide, and means for reflecting solar radiation impinging over a relatively wide area onto said cylindrical fluorescent fiber. Preferably, a compound parabolic mirror is employed for reflecting incident solar radiation onto the optical fluorescent fiber.

The precise characteristics and features of the invention will become more readily apparent in the following detailed description when read in light of the accompanying drawings.

DETAILED DESCRIPTION OF THE INVENTION

Figure 1:
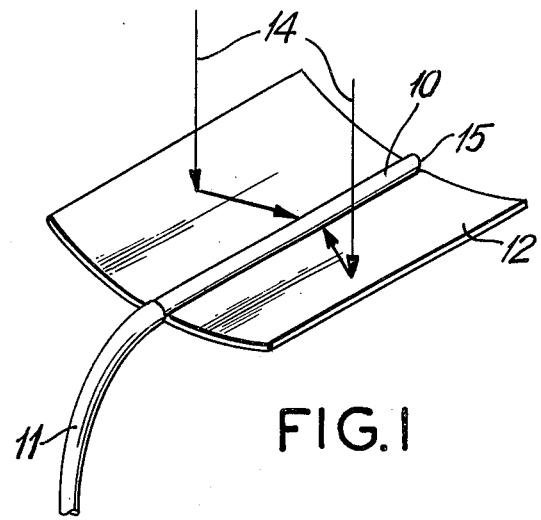
FIG. 1 is a schematic illustration of one embodiment of the present invention.

Turning now to FIG. 1, the system for the collection of solar radiation and its transmission to a point of utilization according to the present invention includes a cylindrical fluorescent fiber 10 optically coupled at one end to an optical wave guide 11. Reflector means such as the parabolic reflector 12 is provided for concentrating solar radiation (indicated by line 14) impinging over a generally wide area and reflecting the solar flux so as to impinge on the fluorescent fiber 10. As a result of light impinging on fluorescent fiber 10, light is generated within the fiber and internally reflected and transmitted by optical wave guide 11 to a point of use. The end 15 of the cylindrical fiber 10 is provided with a mirrored surface so that any light which is transmitted toward the distal end 15 of the cylindrical fluorescent fiber will be reflected back toward the optical wave guide 11.

In operation then, incident solar radiation 14 impinging over a relatively wide area is received by the parabolic mirror 12 and reflected so as to impinge on the fluorescent fiber 10 where the impinging light stimulates the emission of light of a different and longer wave length than the solar radiation. This re-emitted light is internally reflected and transmitted through the coupled optical wave guide 11 to a point of utilization.

Figure 2:
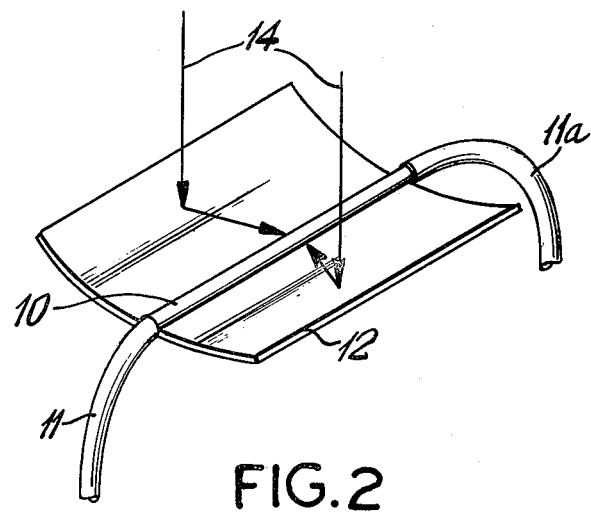
FIG. 2 is a schematic illustration of yet another embodiment of the present invention.

In the embodiment shown in FIG. 2, the cylindrical fluorescent fiber 10 is optically coupled at both its ends to optical wave guides designated generally as 11 and 11a.

It should be appreciated that when using a parabolic mirror such as that shown in FIGS. 1 and 2, it is preferred to maintain the position of the reflector relative to the sun so that the reflected radiation impinges on the fluorescent fiber 10.

Figure 3:
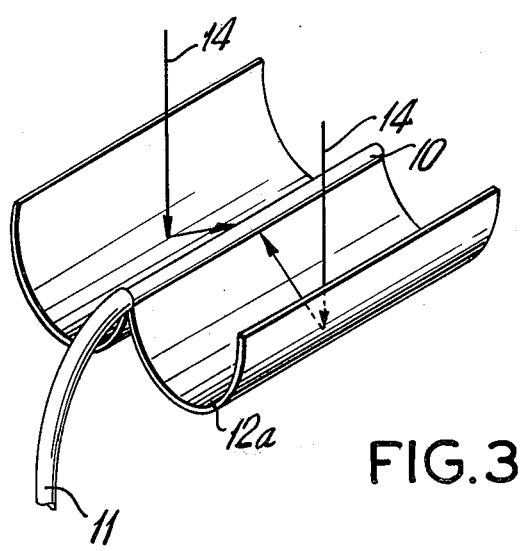
FIG. 3 is a schematic illustration of a particularly preferred embodiment of the present invention.

In the particularly preferred embodiment of this invention shown in FIG. 3, the fluorescent fiber 10 is optically coupled to an optical wave guide 11. The preferred reflector means, however, is a compound parabolic reflector 12a. As shown, the fluorescent fiber 10 is positioned as close as possible to the cusp of the reflector.

As will be appreciated, use of a compound parabolic reflector as shown in FIG. 3, eliminates the need for operating the system in a tracking mode and hence the device can be mounted in a permanent position.

Figure 4:
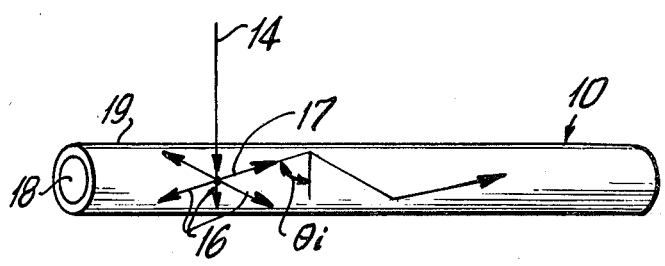
FIG. 4 is a geometrical diagram illustrating one of the principles of operation of the present invention.

A further explanation of the invention is now made with particular reference to FIG. 4. As can be seen in FIG. 4, incident solar radiation 14, which impinges on the fluorescent fiber 10, will be absorbed by the fluorescent material and then re-emitted isotropically as longer wavelength radiation, shown by arrows 16. When that radiation, exemplified by line 17, reaches the front of the top surface of the cylindrical fiber 10, if it makes an angle, $\theta$, greater than the critical angle, that radiation will be totally trapped and reflected within the optical fiber 10 and transmitted toward the end thereof. The critical angle, of course, refers to the largest value which the angle of incident may have for a ray of light passing from a more dense medium to a less dense medium. If the angle of incidence, $\theta$, exceeds the critical angle, the ray of light will not pass into the less dense medium, but will be totally, internally reflected back into the denser medium.

Fluorescent fibers and the method of preparation are well-known. Indeed, fluorescent materials in the form of liquids, plastics and glass have been fabricated into fibers for numerous uses. In the practice of the present invention, however, it is particularly preferred that the fluorescent fiber 10 be a glass fiber which has been impregnated with a suitable fluorescent inorganic oxide. $Eu_2O_3$ and $Sm_2O_3$ are examples of suitable fluorescent materials for impregnating the glass fiber so as to render it sufficiently active. Indeed, the cylindrical fiber collector with its coupled optical wave guide can be conveniently prepared by taking the appropriate length of an optical wave guide and removing from a portion thereof the cladding which is present over the core glass of the optical wave guide. Thereafter, the section of wave guide material which has its cladding removed, can be impregnated or doped with a suitable fluorescent material, thereby providing an active cylindrical fluorescent fiber optically coupled to an optical wave guide.

Figure 5:
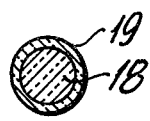
FIG. 5 is a cross sectional diagram of an alternate form of a fluorescent fiber useful in the practice of this invention.

Optionally, the cylindrical fluorescent fiber 10 can be formed, as illustrated in FIG. 5, from a light transparent fiber material 18 on which has been applied at least one fluorescent sheet 19. The fluorescent sheet material 18 may be formed, for example, from a fluorescent dye incorporated in a polymeric binder. Such fabrication techniques are well-known in the art.

In accordance with a particularly preferred embodiment of the present invention, the fluorescent device of the present invention comprises a fluorescent fiber, for example, having a diameter of about ⅜″ and being approximately six feet long, positioned within a compound parabolic reflector with a concentration ratio of two, providing an acceptance angle of 60°. The acceptance angle, of course, is defined by the midline of the reflector to its edge. The cylindrical fluorescent fiber is optically coupled to an optical wave guide so that light impinging upon the parabolic reflector would be redirected toward the fluorescent fiber and the light emitted therein would be internally reflected toward and through the optical wave guide, and thereby transmitted to a point of use.

Among the advantages of the device of the present invention are the following: (a) high concentration ratios can be used; (b) simpler optical coupling to an optical wave guide is achieved; (c) solar radiation is transported as light to the point of use; and, (d) the amount of expensive fluorescent materials required is substantially reduced, thereby lowering the solar receiver cost.

The invention has been described in detail with particular reference to the preferred embodiments thereof, but it will be understood that reasonable variations and modifications are possible without departing from the spirit and scope of the invention.

What is claimed is:

1. A device for the collection and transmission of electromagnetic radiation comprising:
   a cylindrical fluorescent fiber formed from a light transparent fiber material on which has been applied at least one fluorescent sheet, said fluorescent sheet being formed from a fluorescent dye incorporated in a polymeric binder;
   reflector means for reflecting radiation impinging over a relatively wide area so as to impinge on the circumference of said fluorescent fiber;
   at least one optical wave guide optically coupled to one end of said fluorescent fiber whereby light impinging on said fluorescent fiber is internally reflected and transmitted by said optical wave guide to a point of use.

2. The device of claim 1 wherein said reflector means is a parabolic reflector.

3. The device of claim 1 wherein said reflector means is a compound parabolic reflector.

4. The device of claim 2 or 3 wherein at least one optical wave guide is optically coupled at one end to each end of the fluorescent fiber.

5. A solar energy collection and transmission device comprising:
   a cylindrical fluorescent fiber formed from a light transparent fiber material on which has been applied at least one fluorescent sheet, said fluorescent sheet being formed from a fluorescent dye incorporated in a polymeric binder;
   a compound parabolic reflector for focusing solar radiation incident on the circumference of said reflector onto said fluorescent fiber;
   at least one optical wave guide optically coupled to said fluorescent fiber whereby solar radiation impinging on said fluorescent fiber is internally reflected and directed toward said optical wave guide for transmission therethrough to a point of use.

6. The device of claim 5 wherein the compound reflector has a cusp and said fluorescent fiber is positioned adjacent said cusp.

7. The device of claim 6 wherein said device has an angle of acceptance of about 60°.

* * * * *